(12) United States Patent
Zhao et al.

(10) Patent No.: US 12,195,102 B2
(45) Date of Patent: Jan. 14, 2025

(54) VEHICLE STEERING-BY-WIRE SYSTEM AND CONTROL METHOD THEREOF

(71) Applicant: NANJING UNIVERSITY OF AERONAUTICS AND ASTRONAUTICS, Nanjing (CN)

(72) Inventors: Wanzhong Zhao, Nanjing (CN); Zhongkai Luan, Nanjing (CN); Xiaochuan Zhou, Nanjing (CN); Chunyan Wang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 424 days.

(21) Appl. No.: 17/636,006

(22) PCT Filed: May 14, 2020

(86) PCT No.: PCT/CN2020/090294
§ 371 (c)(1),
(2) Date: Feb. 16, 2022

(87) PCT Pub. No.: WO2021/077727
PCT Pub. Date: Apr. 29, 2021

(65) Prior Publication Data
US 2022/0289269 A1 Sep. 15, 2022

(30) Foreign Application Priority Data
Oct. 25, 2019 (CN) .......................... 201911023501.0

(51) Int. Cl.
*B62D 6/00* (2006.01)
*B60W 40/10* (2012.01)
*B62D 5/00* (2006.01)

(52) U.S. Cl.
CPC ............. *B62D 5/001* (2013.01); *B60W 40/10* (2013.01); *B60W 2510/202* (2013.01)

(58) Field of Classification Search
CPC .... B62D 5/001; B62D 5/0481; B62D 15/025; B62D 5/0463; B62D 6/00; B60W 40/10;
(Continued)

(56) References Cited

U.S. PATENT DOCUMENTS

2007/0083686 A1* 4/2007 Misawa ............ H04L 12/40045
710/110
2015/0225015 A1* 8/2015 Takeda .................. B62D 6/008
701/41
2015/0246683 A1* 9/2015 Kuramochi ............ B62D 5/003
701/43

FOREIGN PATENT DOCUMENTS

CN 102320325 1/2012
CN 201811617096.0 3/2019
(Continued)

*Primary Examiner* — Shardul D Patel
(74) *Attorney, Agent, or Firm* — Treasure IP Group, LLC

(57) ABSTRACT

An electric truck steer-by-wire system and a net-work uncertainty control method therefor. Said system comprises: a master control electric power module (14), a slave control electric power module (18), a road-sensing motor module (4), a steering wheel (1), an upper steering column (3), a lower steering column (10), a rack and pinion steering mechanism (12), wheels (13), a first steering angle sensor (2), a second steering angle sensor (11), a steering domain controller (8), and a vehicle-mounted CAN network (9). By means of the design of the master and slave controllers and actuating mechanisms, the system combines the advantages of steering angle tracking, torque tracking and current tracking, there-by satisfying the steering response requirements and power requirements of the electric truck, and further enhancing the robustness and fault-tolerant performance of the system under a random network time lag.

8 Claims, 4 Drawing Sheets

(58) Field of Classification Search
CPC ........... B60W 2510/202; B60W 50/00; B60W 2050/0031; B60W 2300/12; G05B 13/042; G05B 13/048
USPC .......................................................... 701/41
See application file for complete search history.

(56) References Cited

FOREIGN PATENT DOCUMENTS

| | | |
|---|---|---|
| CN | 201611180488.6 | 4/2019 |
| CN | 109808764 | 5/2019 |
| CN | 110775154 | 2/2020 |
| CN | 201710987844.3 | 1/2021 |
| JP | 2005289190 | 10/2005 |

* cited by examiner

VEHICLE STEERING-BY-WIRE SYSTEM AND CONTROL METHOD THEREOF

CROSS REFERENCE TO RELATED APPLICATION

This application claims priority to a PCT/CN2020/090294, filed on May 14, 2020, which in turn takes priority of Chinese Application No. 201911023501.0, filed on Oct. 25, 2019. Both the PCT application and Chinese Application are incorporated herein by reference in their entireties.

FIELD OF THE INVENTION

The disclosure relates generally to automobile chassis systems, particularly to electric truck steer-by-wire system design and control method with network uncertainties therefor.

BACKGROUND OF THE INVENTION

With the increasingly severe global energy situation and the enhancement of environmental protection regulations worldwide, pure electric trucks will become an important development trend of freight commercial vehicles in the future because of their advantages of energy saving and environment friendliness. For example, Tesla semi, an electric truck released by Tesla has an endurance mileage of 800 km, which can effectively satisfy the demand for medium and short distance freight.

Compared with the traditional truck steering system, the steer-by-wire system employed in pure electric trucks is equipped with more sensors, actuators, and control units to achieve advanced driver assistance system and ensure driving safety. Limited by vehicle network bandwidth, the increased signal transmission will induce random network time lag in the lower layer nodes when receiving the objective signals. Random network time lag will degrade the transient performance of the control system and even destroy the stability so that the system is highly likely to oscillate when tracking the continuously varying objective signals. Therefore, considering the influence of random network time lag is the key problem for control system design to improve the robustness and stability of the electric truck steer-by-wire system.

Robust control is widely used in the control algorithm design for time lag systems due to the close relationship between robust control theory and uncertain system theory. For example, in Chinese invention patent application No. CN201611180488.6 entitled "Sliding Mode Robust Control Method for Discrete-Time Lag Uncertain System", the control law is solved by a novel sliding mode reaching law. And the proposed method can guarantee the reachability of the sliding mode. Robust control can effectively provide good control performance for the time lag system. However, limited by the conservative control strategy, only sufficient stability conditions are obtained, and part of control performance is compromised. To solve the above problems, a predictive control algorithm is widely used. The main idea is to model the system uncertainty and design the predictive controller accordingly, to compensate for the network time lag. For example, in Chinese invention patent application No. CN201811617096.0 entitled "Robust Prediction Fault-tolerant Control Method for actuator failure in the Time Lag Uncertain System", a robust fault-tolerant control method is proposed by using linear matrix inequalities and robust predictive control considering the parameter uncertainty and actuator failure in the linear discrete-time lag system. In Chinese invention patent application No. CN201710987844.3 entitled "Delay-dependent Robust Constraint Predictive Control Method for Uncertain System with Unknown Disturbances", a delay-dependent robust constraint predictive control method for an uncertain system with unknown disturbances is proposed to overcome arbitrary bounded disturbances and reduce the control cost. Model predictive control is a widely used method in the research of driverless vehicle trajectory tracking control. However model predictive control is to solve the constrained open-loop quadratic rolling optimization problem at each sampling time, the optimality of a model predictive controller (MPC) does not represent the stability of a closed-loop system.

Therefore, when a large random network time lag exists, the uncertainty term greatly changes the original system model, the existing electric truck steer-by-wire system design and control algorithm cannot effectively coordinate the tradeoff between the tracking accuracy, system stability and operation time of the trajectory tracking system.

SUMMARY OF INVENTION

Given the shortcomings of the state-of-the-art technology, the purpose of this disclosure is to provide an electric truck steer-by-wire system design and control method with network uncertainty. The proposed system design and control method can effectively solve the problem of steering angle tracking fluctuation caused by excluding uncertain factors of random network time lag, and also coordinate the tradeoff between the tracking accuracy, system stability and operation time of the trajectory tracking system.

In order to achieve the above purposes, the technical scheme in the disclosure is as follows.

The disclosure provides an electric truck steer-by-wire system design, which includes a master control electric power module, a slave control electric power module, a road sensing motor module, a steering wheel, an upper steering column, a lower steering column, a rack-pinion steering gear, wheels, a first steering angle sensor, a second steering angle sensor, a steering domain controller and a vehicle-mounted CAN network.

Wherein the steering wheel is connected with a torque input at the end of the upper steering column through a spline, the first steering angle sensor is mounted between the steering wheel and the upper steering column, and the road sensing motor module is mounted at a lower end of the upper steering column; no mechanical connection exists between the upper steering column and the lower steering column, a gap exists between the upper steering column and the lower steering column in a vertical direction, the second steering angle sensor is mounted at an input of the lower steering column, an output end of the lower steering column is connected with the rack-pinion steering gear, the master control electric power module and the slave control electric power module are mounted on a rack of the rack-pinion steering gear, and an end of the rack is connected with the wheels.

The road sensing motor module includes a road sensing controller, a first motor and a first deceleration mechanism; an output of the first motor is connected with an input of the first deceleration mechanism, and a torque is transmitted to the upper steering column after deceleration; and the torque is increased by the first deceleration mechanism; the road sensing controller controls the rotating speed of the first motor; the road sensing controller simulates a pavement steering torque according to an objective steering torque signal transmitted by the steering domain controller; the first steering angle sensor transmits a driver steering angle demand to the steering domain controller through the vehicle-mounted CAN network; the steering domain controller converts the driver steering angle demand into the objective steering torque signal and transmits the objective steering torque signal to the master control electric power module through the vehicle-mounted CAN network.

The master control electric power module includes a master controller, a second motor and a second deceleration mechanism; an output of the second motor is connected with an input of the second deceleration mechanism, and a torque is transmitted to the rack-pinion steering gear after deceleration and torque is increased by the second deceleration mechanism; the master controller calculates an objective current according to a steering torque demand transmitted by the steering domain controller, then distributes the current, and further transmits the objective current to the slave control electric power module.

The slave control electric power module includes a slave controller, a third motor and a third deceleration mechanism; an output of the third motor is connected with an input of the third deceleration mechanism, and a torque is transmitted to the rack-pinion steering gear after deceleration and then torque is increased by the third deceleration mechanism.

The master controller dynamically compares the first steering angle sensor with the second steering angle sensor according to the steering domain controller and the vehicle-mounted CAN network, so as to realize the tracking of a driving intention.

Preferably, the first motor, the second motor, and the third motor all are permanent magnet synchronous motors.

Preferably, the first deceleration mechanism, the second deceleration mechanism, and the third deceleration mechanism all are worm-gear deceleration mechanisms.

The disclosure provides a network uncertainty control method for an electric truck steer-by-wire system, which, based on the above system, includes the following steps.

Step 1): establishing an electric truck trajectory tracking linear error dynamic model with random network time lag;

Step 2): establishing the trajectory tracking performance evaluation system and stability evaluation system of the dynamic model with random network time lag, and then constructing an adaptive prediction model; and Step 3): constructing a time-varying matrix polytope random network time lag uncertainty term representation method and proposing an adaptive model predictive control algorithm for a polytope time lag uncertain system.

Step 1) specifically includes:

11) establishing an electric truck trajectory tracking linear error dynamic model containing random network time lag, as follows (under a ground fixed coordinate system OXY):

$$\dot{\tilde{X}} = A_t \tilde{X} + B_t \tilde{u}$$

$$\tilde{X} = [\dot{y} - \dot{y}_r, \dot{x} - \dot{x}_r, \varphi - \varphi_r, \dot{\varphi} - \dot{\varphi}_r, y - y_r, x - x_r]^T$$

$$\tilde{u} = u_f - u_{fr}$$

where $u_f$ is a control quantity of a front wheel steering angle with random network time lag, x and y are a longitudinal displacement and a transverse displacement of a vehicle respectively, $\dot{x}$ and $\dot{y}$ are a longitudinal speed and a transverse speed of the vehicle, $\varphi$ and $\dot{\varphi}$ are a yaw angle and a yaw rate of the vehicle respectively; $X_r = [\dot{y}_r, \dot{x}_r, \varphi_r, \dot{\varphi}_r, y_r, x_r]^T$ is a state quantity at a reference point, and $u_{fr}$ is a reference control quantity;

$$A_t = \begin{bmatrix} \frac{-2(C_{cf}+C_{cr})}{m\dot{x}} & \frac{\partial f_y}{\partial \dot{x}} & 0 & -\dot{x}+\frac{2(l_r C_{cr}-l_f C_{cf})}{m\dot{x}} & 0 & 0 \\ \dot{\varphi}-\frac{2C_{cf}\delta_f}{m\dot{x}} & \frac{\partial f_x}{\partial \dot{x}} & 0 & \dot{y}-\frac{2l_f C_{cf}\delta_f}{m\dot{x}} & 0 & 0 \\ 0 & 0 & 0 & 1 & 0 & 0 \\ \frac{2(l_r C_{cr}-l_f C_{cf})}{I_z \dot{x}} & \frac{\partial f_\phi}{\partial \dot{x}} & 0 & \frac{-2(l_f^2 C_{cf}+l_r^2 C_{cr})}{I_z \dot{x}} & 0 & 0 \\ \cos(\varphi) & \sin(\varphi) & \dot{x}\cos(\varphi)-\dot{y}\sin(\varphi) & 0 & 0 & 0 \\ -\sin(\varphi) & \cos(\varphi) & -\dot{y}\cos(\varphi)-\dot{x}\sin(\varphi) & 0 & 0 & 0 \end{bmatrix}$$

$$B_t = \begin{bmatrix} \frac{2C_{cf}}{m} & \frac{2C_{cf}\left(2\delta_f - \frac{\dot{y}+l_f\dot{\varphi}}{\dot{x}}\right)}{m} & 0 & \frac{2l_f C_{cf}}{I_z} & 0 & 0 \end{bmatrix}^T \text{ where}$$

$$\frac{\partial f_y}{\partial \dot{x}} = \frac{2C_{cf}(\dot{y}_r + l_f \dot{\varphi}_r) + 2C_{cr}(\dot{y} - l_r \dot{\varphi})}{m\dot{x}^2} - \dot{\varphi}$$

$$\frac{\partial f_x}{\partial \dot{x}} = \frac{2C_{cf}\delta_f(\dot{y} + l_f \dot{\varphi})}{m\dot{x}^2}$$

$$\frac{\partial f_\phi}{\partial \dot{x}} = \frac{2l_f C_{cf}(\dot{y} + l_f \dot{\varphi}) - 2l_r C_{cr}(\dot{y} - l_r \dot{\varphi})}{I_z \dot{x}^2}$$

12) performing discretization of the continuous model:
performing discretization of the electric truck trajectory tracking linear error dynamic model with a ground fixed coordinate system OXY, as follows:

$$\tilde{X}(k+1) = A_d \tilde{X}(k) + B_d \tilde{u}(k) \text{ where}$$

$$\begin{cases} A_d = e^{A_t T_s} = L^{-1}[sI - A_t]^{-1} \\ B_d = \int_0^{T_s} e^{A_t(T_s - \theta)} B_t d\theta \end{cases}$$

where $T_s$ is a sampling time, $L^{-1}$ is inverse Laplace transform, and s is a Laplace operator; and 13) performing augmentation on a system model:
establishing a new state quantity based on the state quantity and the control quantity of the electric truck trajectory tracking linear error dynamic model with random network time lag established in step 11), as follows:

$$\xi(k) = \begin{bmatrix} \tilde{X}(k) \\ \tilde{u}(k-1) \end{bmatrix}$$

to obtain a state space expression of a discrete ideal trajectory tracking system, as follows:

$$\xi(k+1) = \bar{A}_d \xi(k) + \bar{B}_d \Delta u(k) \text{ where}$$

$$\bar{A}_d = \begin{bmatrix} A_d & B_d \\ 0 & I \end{bmatrix}, \bar{B}_d = \begin{bmatrix} B_d \\ I \end{bmatrix}.$$

Preferably, step 2) specifically includes:
21) establishing a relationship between a prediction time domain and a control time domain, wherein
at each sampling time, different values of the prediction time domain and the control time domain change the dimensions of a prediction equation coefficient matrix, thus affecting the solution direction of rolling optimization; the relationship between the control time domain and the prediction time domain is as follows:

$$N_c = \text{round}\left(\frac{N_p}{n}\right)$$

where $N_p$ is a prediction time domain, $N_c$ is a control time domain, round(.) is a rounding function, n is an undetermined coefficient, and n={1, 2 ... $N_p$};

22) establishing an adaptive prediction time domain function, wherein
the prediction time domain and the control time domain are dynamically determined by comprehensively considering environmental parameters such as a road curvature, working condition parameters such as a vehicle speed, and network conditions, and an adaptive prediction time domain function is accordingly proposed as follows:

$$N_p = f_{N_p}(V_{xk}, C_k, \tau_k) = k_1 V_{xk} + b_1 + k_2 C_k + b_2 + k_3 \tau_k + b_3$$

where $V_{sk}$, $C_k$ and $\tau_k$ are respectively a longitudinal speed of the vehicle, a trajectory curvature and a network delay obtained by a time stamp at time k, $k_i$ and $b_i$ are undetermined coefficients, and i=1, 2, 3, obtained through offline optimization;

23) establishing a parameter offline optimization model, wherein
the parameter offline optimization model is as follows:

$$\begin{cases} \min \quad f_{fitness} = \frac{k_1}{s_1} f_{Time}(N_P, N_c) + \frac{k_2}{s_2} f_{Error}(N_P, N_c) \\ \text{s.t.} \quad \max\{f_{Time}(N_P, N_c)\} \leq T_s \end{cases}$$

The physical meaning of which is to change the values of the prediction time domain and the control time domain by adjusting the undetermined coefficients in multiple iterations, so as to obtain a set of undetermined coefficients which minimize the calculation time and tracking error, where $k_1$ and $k_2$ are respectively weight factors, and $s_1$ and $s_2$ are respectively scale factors which are used to convert two objectives into the same order of magnitude; an objective function $f_{Time}(.)$ is a CPU calculation time required for a process of rolling optimization, and an objective function $f_{Error}(.)$ is an average trajectory tracking error in a whole process; the constraint is that the CPU calculation time required for a process of rolling optimization does not exceed the sampling time;

24) updating the prediction model, wherein
an undermined parameter is obtained by solving an offline optimization, and then a system prediction equation is obtained as follows:

$$Y(k) = \psi \xi(k) + \Theta \Delta u(k)$$

when the prediction time domain $N_p$ and the control time domain $N_c$ change according to working conditions and coefficient matrices of the state quantity, the control quantity in the prediction model also change adaptively, where Y(k) is a prediction output at time k, $\xi(k)$ is a state vector at time k, $\Delta u(k)$ is a control increment vector at time k, $\psi$ and $\Theta$ are respectively coefficient matrices of the state quantity and the control quantity, and the equations are as follows:

$$\psi = \begin{bmatrix} \bar{C}_d \bar{A}_d \\ \bar{C}_d \bar{A}_d^2 \\ \vdots \\ \bar{C}_d \bar{A}_d^{N_p} \end{bmatrix},$$

$$\Theta = \begin{bmatrix} \bar{C}_d \bar{B}_d & 0 & \cdots & 0 \\ \bar{C}_d \bar{A}_d \bar{B}_d & \bar{C}_d \bar{B}_d & & \vdots \\ & & \ddots & 0 \\ \vdots & \vdots & & \bar{C}_d \bar{B}_d \\ & & & \vdots \\ \bar{C}_d \bar{A}_d^{N_p-1} \bar{B}_d & \bar{C}_d \bar{A}_d^{N_p-2} \bar{B}_d & \cdots & \bar{C}_d \bar{A}_d^{N_p-N_c-1} \bar{B}_d \end{bmatrix};$$

and 25) determining a next sampling time:
if a next time still exists in an instruction generated by a counting module of a steering domain controller, returning to step 22), otherwise ending the whole solution process.

Preferably, step 3) specifically includes:
31) receiving an upper layer trajectory signal input and setting a corresponding filter of a steering domain controller to a high level;
32) establishing a time lag augmented system model:
establishing a generalized state vector of the system with random network time lag as follows:

$$\xi_{\tau_k}(k) = [\tilde{X}(k) u(k-1) \ldots u(k-\gamma-1)]^T$$

establishing a discrete system state equation with random network time lag as follows:

$$\xi_{\tau_k}(k+1) = \bar{A}_{d\tau_k} \xi_{\tau_k}(k) + \bar{B}_{d\tau_k} \Delta u(k) + \Delta_k \Delta U(k) \text{ where}$$

$$\bar{A}_{d\tau_k} = \begin{bmatrix} A_d & \Delta_{1,k} & \cdots & \Delta_{\gamma-1,k} & \Delta_{\gamma,k} \\ 0 & I & \cdots & 0 & 0 \\ 0 & 0 & I & & 0 \\ \vdots & \vdots & & \ddots & \vdots \\ 0 & 0 & \cdots & 0 & I \end{bmatrix}, \bar{B}_{d\tau_k} = \begin{bmatrix} B_{d\tau_k} \\ I \\ 0 \\ \vdots \\ 0 \end{bmatrix},$$

-continued $$\bar{B}_{d\tau_k} = \begin{bmatrix} B_{d\tau_k} \\ I \\ 0 \\ \vdots \\ 0 \end{bmatrix}$$

$$\Delta_k = \begin{bmatrix} \Delta_{1,k} & \Delta_{2,k} & \cdots & \Delta_{\gamma,k} \\ I & & & \\ & I & & \\ & & \ddots & \\ & & & I \end{bmatrix}, \Delta U(k) = \begin{bmatrix} \Delta u(k-1) \\ \Delta u(k-2) \\ \vdots \\ \Delta u(k-\gamma) \end{bmatrix}$$

33) establishing a time lag uncertainty coefficient linear representation method and a random network time lag polytope model, wherein
$\Delta_{i,k}$ is an uncertainty coefficient caused by random network delay as follows:

$$\Delta_{i,k} = \int_0^{\Delta\Gamma_{k-i}} e^{A_t(T_s-\theta)} B_t d\theta$$

$$i = \{1, 2 \ldots \gamma\}$$

$$\begin{cases} \Delta\Gamma_{k-i} = \Gamma_{k-i} - \Gamma_{k-i-1} \\ \Gamma_{k-i} = \min\{\max\{0, \tau_{k-i} - iT_s\}, T_s\} \end{cases}$$

where $\Delta\Gamma_i$ is an integral upper limit which is an actual action time length of a control signal $\Delta u(k-i)$ in a corresponding interval, and $\tau_{k-i}$ is a total delay length of signals transmitted at time $(k-i)T_s$; and
establishing a random network time lag uncertainty coefficient matrix, which is expressed by a polytope model as follows:

$$\begin{bmatrix} \Delta_{0,k} \\ \Delta_{1,k} \\ \vdots \\ \Delta_{\gamma,k} \end{bmatrix} = \begin{bmatrix} \eta_{0,0}(k) \\ \eta_{1,0}(k) \\ \vdots \\ \eta_{\gamma,0}(k) \end{bmatrix} \hat{\Delta}_0 + \begin{bmatrix} \eta_{0,1}(k) \\ \eta_{1,1}(k) \\ \vdots \\ \eta_{\gamma,2}(k) \end{bmatrix} \hat{\Delta}_1 + \ldots + \begin{bmatrix} \eta_{0,h}(k) \\ \eta_{1,h}(k) \\ \vdots \\ \eta_{\gamma,h}(k) \end{bmatrix} \hat{\Delta}_h$$

$$\begin{bmatrix} \hat{\Delta}_1 \\ \hat{\Delta}_2 \\ \vdots \\ \hat{\Delta}_h \end{bmatrix} = e^{A_t T_s} \begin{bmatrix} \frac{(-1)^2}{1!} A_t^0 & \frac{(-1)^3}{2!} A_t^1 & \cdots & \frac{(-1)^{h+1}}{h!} A_t^{h-1} \end{bmatrix} \begin{bmatrix} x_{\tau k,1}^T \\ x_{\tau k,2}^T \\ \vdots \\ x_{\tau k,h}^T \end{bmatrix} B_t$$

$$\begin{bmatrix} x_{\tau k,1} \\ x_{\tau k,2} \\ \vdots \\ x_{\tau k,h} \end{bmatrix} = \begin{bmatrix} \bar{x}_{\tau k} & 0 & \cdots & 0 \\ \bar{x}_{\tau k} & \bar{x}_{\tau k}^2 & & \vdots \\ \vdots & & \ddots & 0 \\ \bar{x}_{\tau k} & \bar{x}_{\tau k}^2 & \cdots & \bar{x}_{\tau k}^h \end{bmatrix}$$

$$\bar{x}_{\tau k} = v T_s$$

where $\eta_{i,h}(k)$ is a time-varying coefficient of polyhedron vertices related to network time lag k, which satisfies a relationship as follows:

$$\sum_{n=0}^{h} \eta_{i,n}(k) = 1$$

$$i = \{1, 2 \ldots \gamma\}$$

all signals act in a sampling cycle; $v \in [0,1)$ represents a time length where the predictive control should account for the effective control signal transmitted at time $(k-1)T_s$ with the control quantity at time k;

34) establishing an adaptive model predictive control algorithm for an uncertain system:
establishing a trajectory tracking dynamic optimization index based on the dynamic model as follows:

$$J(\xi(k), U(k-1), \Delta u(k)) =$$

$$\sum_{i=1}^{N_p} \|\xi_{\tau_k}(k+i) - \xi_{\tau_k}(k+i)\|^2 Q + \sum_{i=1}^{N_c} \|\Delta u(k+i)\|^2 R + \rho\varepsilon^2$$

where $N_p$ is a prediction time domain, $N_c$ is a control time domain, Q and R are weight matrices, $\rho$ is a relaxation factor weight coefficient, and $\varepsilon$ is a relaxation factor; and
establishing a dynamic optimization model of a driverless vehicle trajectory tracking controller with network time lag in each control cycle as follows:

$$\min[\Delta u(t)^T, \varepsilon]^T H_t [\Delta u(t)^T, \varepsilon] + G_t [\Delta u(t)^T, \varepsilon]$$

$$\text{s.t.} \begin{bmatrix} \Delta U_{min} \\ y_{hcmin} \\ y_{scmin} - \varepsilon \end{bmatrix} \leq \begin{bmatrix} \Delta U \\ y_{hc} \\ y_{sc} \end{bmatrix} \leq \begin{bmatrix} \Delta U_{max} \\ y_{hcmax} \\ +y_{hcmax} + \varepsilon \end{bmatrix}$$

$$H_t = \begin{bmatrix} \Theta^T Q\Theta + R & 0 \\ 0 & \rho \end{bmatrix}, G_t = [2e^T Q\Theta \quad 0]$$

where $\Delta U$ is a control incremental constraint, $y_{hc}$ is a hard constraint output, $y_{sc}$ is a soft constraint output, the range of the soft constraint output can be adjusted by the relaxation factor $\varepsilon$, and e is a tracking error in the prediction time domain; and 35) determining a next sampling time:
if a next time still exists in an instruction generated by a counting module of the steering domain controller, returning to step 33), otherwise ending a whole solution process.

The benefits of the disclosure:

1. The disclosure integrates the advantages of steering angle tracking, steering torque tracking and current tracking, and enhances the system robustness and fault tolerance meanwhile meeting the electric truck steering response and power demands.
2. The disclosure comprehensively considers the controller robustness and accuracy with network time lag and the calculation efficiency in the rolling optimization, and then proposes an adaptive model predictive control (UM-AMPC) algorithm for an uncertain system. The controller predicts and solves the control quantity at the next time according to the objective steering angle and augmented state quantity received by the lower node at the current time to the upper bound of the network delay, which can effectively enhance the system stability and tracking accuracy with random network time lag.

In order to facilitate the understanding for someone skilled in the art, the disclosure is further described in detail with an embodiment and accompanying drawings below. The content mentioned in the implementation is not the limitation to the disclosure.

Figure 1:
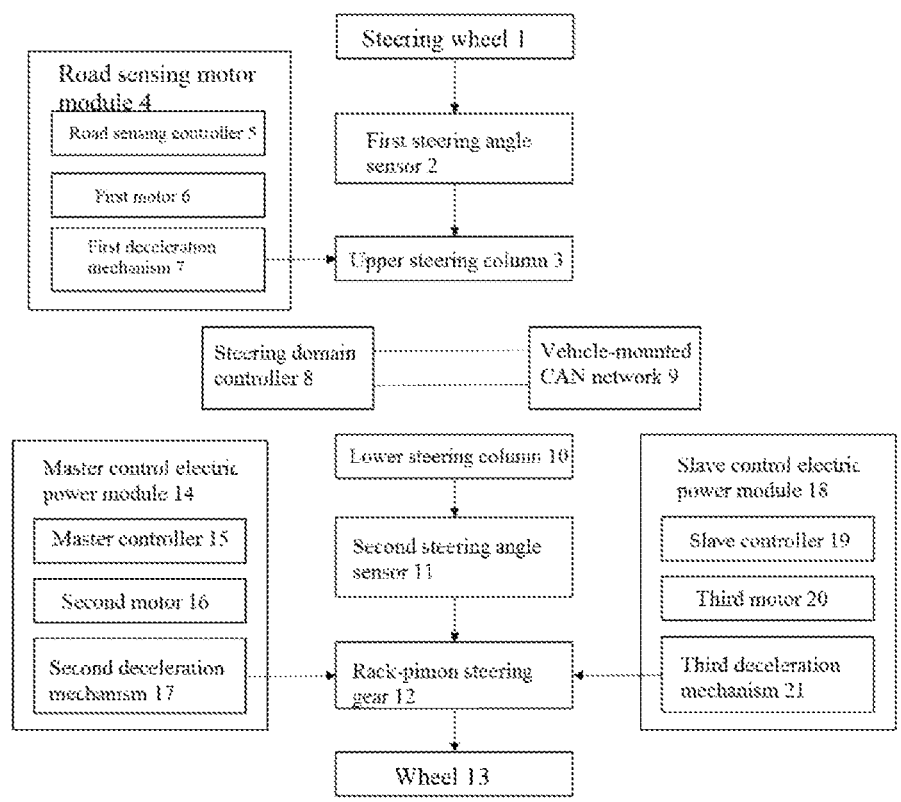
FIG. 1 is a schematic diagram of an electric truck steer-by-wire system according to the disclosure.
Figure 2:
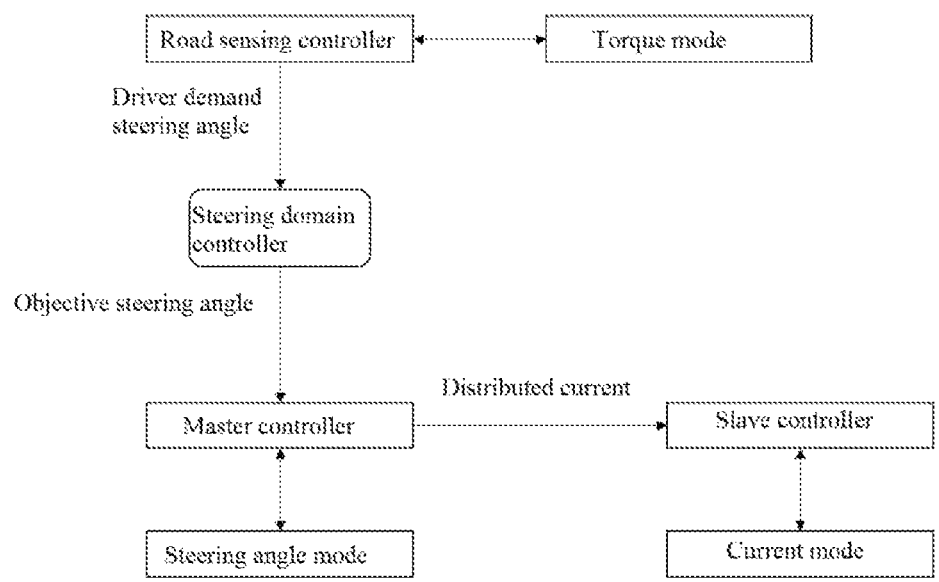
FIG. 2 is a logic diagram of master and slave control strategies according to the disclosure.

Referring to FIG. 1 and FIG. 2, the disclosure provides an electric truck steer-by-wire system, which includes a master control electric power module 14, a slave control electric power module 18, a road sensing motor module 4, a steering wheel 1, an upper steering column 3, a lower steering column 10, a rack-pinion steering gear 12, wheels 13, a first steering angle sensor 2, a second steering angle sensor 11, a steering domain controller 8 and a vehicle-mounted CAN network 9.

The steering wheel 1 is connected with a torque input of the upper steering column 3 by a spline. The first steering angle sensor 2 is mounted between the steering wheel 1 and the upper steering column 3. The road sensing motor module 4 is mounted at a lower end of the upper steering column 3. No mechanical connection exists between the upper steering column 3 and the lower steering column 10. A gap exists between the upper steering column and the lower steering column in a vertical direction. The second steering angle sensor 11 is mounted at an input of the lower steering column 10. An output of the lower steering column 10 is connected with the rack-pinion steering gear 12. The master control electric power module 14 and the slave control electric power module 18 are mounted on a rack of the rack-pinion steering gear 12. An end of the rack is connected with the wheels 13, so as to realize the electric truck steer-by-wire operation with a large front axle load.

The road sensing motor module 4 includes a road sensing controller 5, a first motor 6 and a first deceleration mechanism 7. An output of the first motor 6 is connected with an input of the first deceleration mechanism 7. A torque is transmitted to the upper steering column 3 after deceleration and torque is increased by the first deceleration mechanism 7. The road sensing controller 5 controls the rotating speed of the first motor 6. The road sensing controller 5 simulates a pavement steering torque according to an objective steering torque signal transmitted by the steering domain controller 8. The first steering angle sensor 2 transmits a driver steering angle demand to the steering domain controller 8 by the vehicle-mounted CAN network 9. The steering domain controller 8 converts the driver steering angle demand into the objective steering torque signal and transmits the objective steering torque signal to the master control electric power module 14 by the vehicle-mounted CAN network 9. The road sensing controller 5 supplies power to the first motor 6 and the first steering angle sensor 2.

The master control electric power module 14 includes a master controller 15, a second motor 16 and a second deceleration mechanism 17. An output of the second motor 16 is connected with an input of the second deceleration mechanism 17. A torque is transmitted to the rack-pinion steering gear 12 after deceleration and torque is increased by the second deceleration mechanism 17. The master controller 15 calculates an objective current according to the steering torque demand from the steering domain controller 8, and then distributes the current, and further transmits the objective current to the slave control electric power module 18. The master controller 15 supplies power to the second motor 16 and the second steering angle sensor 11.

The slave control electric power module 18 includes a slave controller 19, a third motor 20 and a third deceleration mechanism 21. An output end of the third motor 20 is connected with an input of the third deceleration mechanism 21. A torque is transmitted to the rack-pinion steering gear 12 after deceleration and torque is increased by the third deceleration mechanism 21. The slave controller includes a current acquisition circuit, so as to realize the acquisition of a present current signal from the third motor 20. The slave controller 19 supplies power to the third motor 20.

The master controller 15 dynamically compares the first steering angle sensor 2 with the second steering angle sensor 11 according to the steering domain controller 8 and the vehicle-mounted CAN network 9, so as to realize the tracking of a driving intention.

The first motor, the second motor and the third motor all are permanent magnet synchronous motors.

The first deceleration mechanism, the second deceleration mechanism and the third deceleration mechanism all are worm-gear deceleration mechanisms.

The disclosure provides a network uncertain control method for an electric truck steer-by-wire system, which, based on the above system, includes the following steps:

step 1): establishing an electric truck trajectory tracking linear error dynamic model with random network time lag;

step 2): establishing a trajectory tracking performance evaluation system and dynamic model stability evaluation system with random network time lag, and constructing an adaptive prediction model; and step 3): constructing a time-varying matrix polytope random network time lag uncertainty term representation method and proposing an adaptive model predictive control algorithm for a polytope time lag uncertain system.

Step 1) specifically includes:

11) establishing an electric truck trajectory tracking linear error dynamic model with random network time lag, as follows (using a ground fixed coordinate system OXY):

$$\dot{\tilde{X}} = A_t \tilde{X} + B_t \tilde{u}$$

$$\tilde{X} = [\dot{y} - \dot{y}_r,\ \dot{x} - \dot{x}_r,\ \varphi - \varphi_r,\ \dot{\varphi} - \dot{\varphi}_r,\ y - y_r,\ x - x_r]^T$$

$$\tilde{u} = u_f - u_{fr}$$

where $u_f$ is a control quantity of a front wheel steering angle with random network time lag, x and y are respectively a longitudinal displacement and a transverse displacement of a vehicle, $\dot{x}$ and $\dot{y}$ are respectively a longitudinal speed and a transverse speed of the vehicle, $\varphi$ and $\dot{\varphi}$ are respectively a yaw angle and a yaw rate of the vehicle; $X_r = [\dot{y}_r,\ \dot{x}_r,\ \varphi_r,\ \dot{\varphi}_r,\ y_r,\ x_r]^T$ is a state quantity at a reference point, and $u_{fr}$ is a reference control quantity;

$$A_t = \begin{bmatrix} \frac{-2(C_{cf}+C_{cr})}{m\dot{x}} & \frac{\partial f_{\dot{y}}}{\partial \dot{x}} & 0 & -\dot{x}+\frac{2(l_rC_{cr}-l_fC_{cf})}{m\dot{x}} & 0 & 0 \\ \dot{\varphi}-\frac{2C_{cf}\delta_f}{m\dot{x}} & \frac{\partial f_{\dot{x}}}{\partial \dot{x}} & 0 & \dot{y}-\frac{2l_fC_{cf}\delta_f}{m\dot{x}} & 0 & 0 \\ 0 & 0 & 0 & 1 & 0 & 0 \\ \frac{2(l_rC_{cr}-l_fC_{cf})}{I_z\dot{x}} & \frac{\partial f_{\dot{\varphi}}}{\partial \dot{x}} & 0 & \frac{-2(l_f^2C_{cf}+l_r^2C_{cr})}{I_z\dot{x}} & 0 & 0 \\ \cos(\varphi) & \sin(\varphi) & \dot{x}\cos(\varphi)-\dot{y}\sin(\varphi) & 0 & 0 & 0 \\ -\sin(\varphi) & \cos(\varphi) & -\dot{y}\cos(\varphi)-\dot{x}\sin(\varphi) & 0 & 0 & 0 \end{bmatrix}$$

$$B_t = \begin{bmatrix} \frac{2C_{cf}}{m} & \frac{2C_{cf}\left(2\delta_f - \frac{\dot{y}+l_f\dot{\varphi}}{\dot{x}}\right)}{m} & 0 & \frac{2l_fC_{cf}}{I_z} & 0 & 0 \end{bmatrix}^T$$

where $$\frac{\partial f_{\dot{y}}}{\partial \dot{x}} = \frac{2C_{cf}(\dot{y}_r+l_f\dot{\varphi}_r)+2C_{cr}(\dot{y}-l_r\dot{\varphi})}{m\dot{x}^2} - \dot{\varphi}$$

$$\frac{\partial f_{\dot{x}}}{\partial \dot{x}} = \frac{2C_{cf}\delta_f(\dot{y}+l_f\dot{\varphi})}{m\dot{x}^2}$$

$$\frac{\partial f_{\dot{\varphi}}}{\partial \dot{x}} = \frac{2l_fC_{cf}(\dot{y}+l_f\dot{\varphi})-2l_rC_{cr}(\dot{y}-l_r\dot{\varphi})}{I_z\dot{x}^2}$$

12) performing discretization of the continuous model:
performing discretization on the electric truck trajectory tracking linear error dynamic model with a ground fixed coordinate system OXY, as follows:

$$\tilde{X}(k+1) = A_d\tilde{X}(k) + B_d\tilde{u}(k)$$

wherein $$\begin{cases} A_d = e^{A_tT_s} = L^{-1}[sI-A_t]^{-1} \\ B_d = \int_0^{T_s} e^{A_1(T_s-\theta)}B_t d\theta \end{cases}$$

where $T_s$ is a sampling time, $L^{-1}$ is inverse Laplace transform, and s is a Laplace operator; and 13) performing augmentation on a system model:
establishing a new state quantity based on the state quantity and the control quantity of the electric truck trajectory tracking linear error dynamic model with random network time lag, established in step 11), as follows:

$$\xi(k) = \begin{bmatrix} \tilde{X}(k) \\ \tilde{u}(k-1) \end{bmatrix}$$

to obtain a state space expression of a discrete ideal trajectory tracking system, as follows:

$$\xi(k+1) = \bar{A}_d\xi(k) + \bar{B}_d\Delta u(k)$$

wherein $$\bar{A}_d = \begin{bmatrix} A_d & B_d \\ 0 & I \end{bmatrix}, \bar{B}_d = \begin{bmatrix} B_d \\ I \end{bmatrix}.$$

Figure 3:
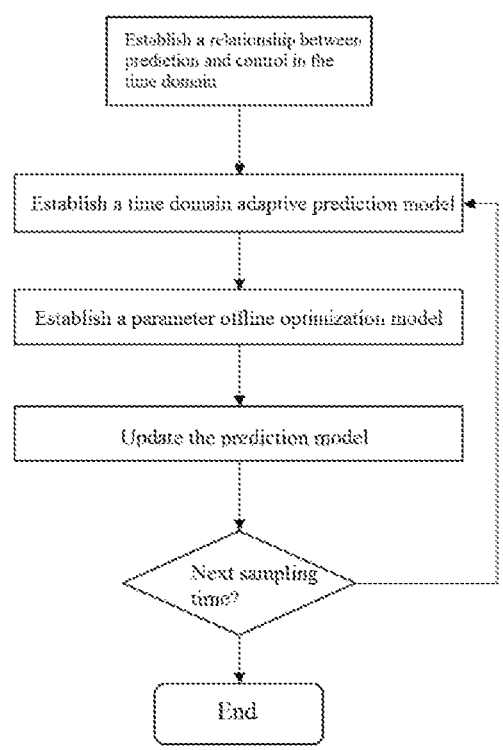
FIG. 3 is a flowchart of an adaptive prediction model according to the disclosure.

Referring to FIG. 3, step 2) specifically includes:
21) establishing a relationship between a prediction time domain and a control time domain, wherein
at each sampling time, different values of the prediction time domain and the control time domain change the dimensions of a prediction equation coefficient matrix, thus affecting the solution direction of rolling optimization; the relationship between the value of the control time domain and the prediction time domain is as follows:

$$N_c = \text{round}\left(\frac{N_p}{n}\right)$$

where $N_p$ is a prediction time domain, $N_c$ is a control time domain, round(.) is a rounding function, n is an undetermined coefficient, and n={1, 2 ... $N_p$};

22) establishing an adaptive prediction time domain function, wherein
the values of the prediction time domain and the control time domain are dynamically determined by comprehensively considering environmental parameters such as a road curvature, working condition parameters such as a vehicle speed and network conditions, and an adaptive prediction time domain function is accordingly proposed as follows:

$$N_p = f_{N_p}(V_{xk}, C_k, \tau_k) = k_1V_{xk} + b_1 + k_2C_k + b_2 + k_3\tau_k + b_3$$

where $V_{xk}$, $C_k$ and $\tau_k$ are respectively longitudinal speed of the vehicle, a trajectory curvature and a network delay obtained by a time stamp at time k, $k_i$ and $b_i$ are undetermined coefficients, and i=1, 2, 3, obtained by offline optimization;

23) establishing a parameter offline optimization model, wherein
the parameter offline optimization model is as follows:

$$\begin{cases} \min \ f_{fitness} = \frac{k_1}{s_1}f_{Time}(N_P, N_C) + \frac{k_2}{s_2}f_{Error}(N_P, N_C) \\ \text{s.t.} \quad \max\{f_{Time}(N_P, N_c)\} \leq T_s \end{cases}$$

the values of the prediction time domain and the control time domain are obtained by adjusting the undetermined coefficients in multiple iterations, so as to obtain a set of undetermined coefficients that minimize the calculation time and tracking error, where $k_1$ and $k_2$ are weight factors, and $s_1$ and $s_2$ are scale factors used to convert two objectives into the same order of magnitude; an objective function $f_{Time}(.)$ is a CPU calculation time required for a rolling optimization, and an objective function $f_{Error}(.)$ is an average trajectory tracking error in a whole process; the constraint is that the CPU calculation time required for a rolling optimization process does not exceed the sampling time;

24) updating the prediction model, wherein
after an undermined parameter is obtained by solving by offline optimization, a system prediction equation expression is obtained as follows:

$$Y(k) = \psi \xi(k) + \Theta \Delta u(k)$$

when the prediction time domain $N_p$ and the control time domain $N_c$ change according to working conditions, coefficient matrices of the state quantity and the control quantity in the prediction model also change adaptively, where Y(k) is a prediction output at time k, $\xi(k)$ is a state vector at time k, $\Delta u(k)$ is a control increment vector at time k, $\psi$ and $\Theta$ are respectively coefficient matrices of the state quantity and the control quantity, and the expressions are as follows:

$$\psi = \begin{bmatrix} \overline{C}_d \overline{A}_d \\ \overline{C}_d \overline{A}_d^2 \\ \vdots \\ \overline{C}_d \overline{A}_d^{N_p} \end{bmatrix}, \Theta = \begin{bmatrix} \overline{C}_d \overline{B}_d & 0 & \cdots & 0 \\ \overline{C}_d \overline{A}_d \overline{B}_d & \overline{C}_d \overline{B}_d & & \vdots \\ & & \ddots & 0 \\ \vdots & \vdots & & \overline{C}_d \overline{B}_d \\ \overline{C}_d \overline{A}_d^{N_p-1} \overline{B}_d & \overline{C}_d \overline{A}_d^{N_p-2} \overline{B}_d & \cdots & \overline{C}_d \overline{A}_d^{N_p-N_c} \overline{B}_d \end{bmatrix};$$

and 25) determining a next sampling time:
if a next time still exists in an instruction generated by a counting module of a steering domain controller, returning to step 22), otherwise ending the whole solution process.

Figure 4:
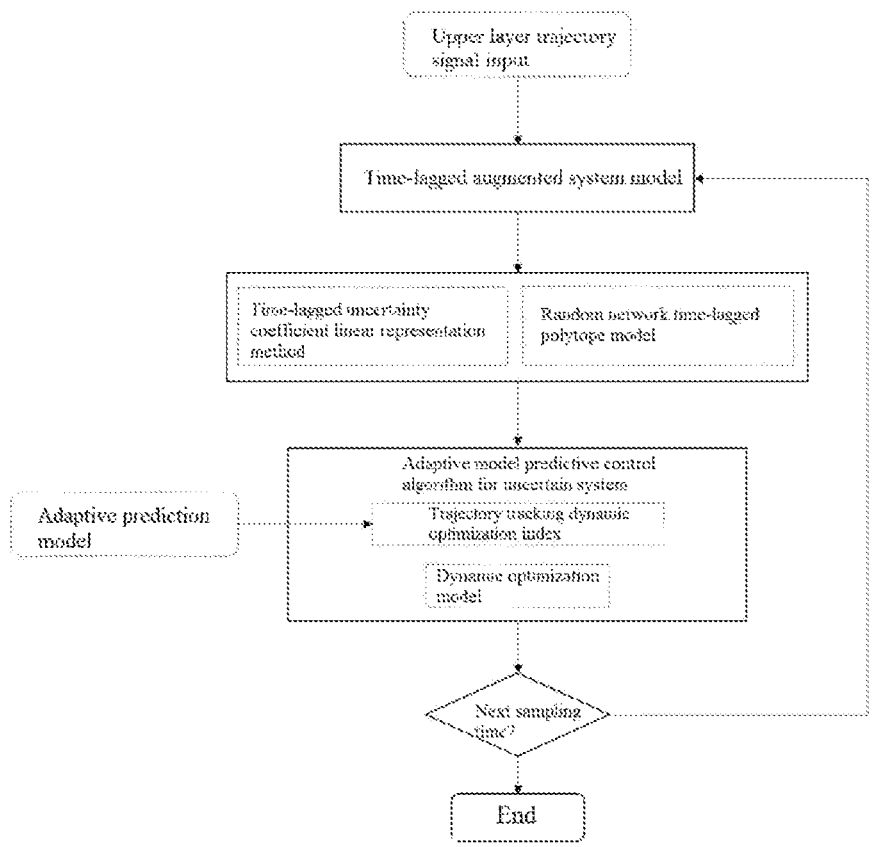
FIG. 4 is a flowchart of an adaptive model predictive control algorithm for a time lag uncertainty system according to the disclosure.

Referring to FIG. 4, step 3) specifically includes:

31) receiving an upper trajectory signal input and setting a corresponding filter of a steering domain controller to a high level;

32) establishing a time lag augmented system model:
establishing a generalized state vector of the system under with random network time lag as follows:

$$\xi_{\tau_k}(k) = [\tilde{X}(k) u(k-1) \ldots u(k-\gamma-1)]^T$$

establishing a discrete system state equation considering random network time lag as follows:

$$\xi_{\tau_k}(k+1) = \overline{A}_{d\tau_k} \xi_{\tau_k}(k) + \overline{B}_{d\tau_k} \Delta u(k) + \Delta_k \Delta U(k)$$

wherein $$\overline{A}_{d\tau_k} = \begin{bmatrix} A_d & \Delta_{1,k} & \cdots & \Delta_{\gamma-1,k} & \Delta_{\gamma,k} \\ 0 & I & \cdots & 0 & 0 \\ 0 & 0 & I & & 0 \\ \vdots & \vdots & & \ddots & \vdots \\ 0 & 0 & \cdots & 0 & I \end{bmatrix}, \overline{B}_{d\tau_k} = \begin{bmatrix} B_{d\tau_k} \\ I \\ 0 \\ \vdots \\ 0 \end{bmatrix}, \overline{B}_{d\tau_k} = \begin{bmatrix} B_{d\tau_k} \\ I \\ 0 \\ \vdots \\ 0 \end{bmatrix}$$

$$\Delta_k = \begin{bmatrix} \Delta_{1,k} & \Delta_{2,k} & \cdots & \Delta_{\gamma,k} \\ I & & & \\ & I & & \\ & & \ddots & \\ & & & I \end{bmatrix}, \Delta U(k) = \begin{bmatrix} \Delta u(k-1) \\ \Delta u(k-2) \\ \vdots \\ \Delta u(k-\gamma) \end{bmatrix}$$

33) establishing a time lag uncertainty coefficient linear representation method and a random network time lag polytope model, wherein
$\Delta_{i,k}$ is an uncertainty coefficient caused by random network delay as follows:

$$\Delta_{i,k} = \int_0^{\Delta \Gamma_{k-i}} e^{A_t(T_s - \theta)} B_t d\theta$$

$$i = \{1, 2 \cdots \gamma\}$$

$$\begin{cases} \Delta \Gamma_{k-i} = \Gamma_{k-i} - \Gamma_{k-i-1} \\ \Gamma_{k-i} = \min\{\max\{0, \tau_{k-i} - iT_s\}, T_s\} \end{cases}$$

wherein $\Delta \Gamma_i$ is an integral upper limit, which is an actual action time length of a control signal $\Delta u(k-i)$ in a corresponding interval, and $\tau_{k-i}$ is a total delay length of signals transmitted at time $(k-i)T_s$; and establishing a random network time lag uncertainty coefficient matrix, which is capable of being expressed by a polytope model as follows:

$$\begin{bmatrix} \Delta_{0,k} \\ \Delta_{1,k} \\ \vdots \\ \Delta_{\gamma,k} \end{bmatrix} = \begin{bmatrix} \eta_{0,0}(k) \\ \eta_{1,0}(k) \\ \vdots \\ \eta_{\gamma,0}(k) \end{bmatrix} \hat{\Delta}_0 + \begin{bmatrix} \eta_{0,1}(k) \\ \eta_{1,1}(k) \\ \vdots \\ \eta_{\gamma,2}(k) \end{bmatrix} \hat{\Delta}_1 + \ldots + \begin{bmatrix} \eta_{0,h}(k) \\ \eta_{1,h}(k) \\ \vdots \\ \eta_{\gamma,h}(k) \end{bmatrix} \hat{\Delta}_h$$

$$\begin{bmatrix} \hat{\Delta}_1 \\ \hat{\Delta}_2 \\ \vdots \\ \hat{\Delta}_h \end{bmatrix} = e^{A_t T_s} \left[ \frac{(-1)^2}{1!} A_t^0 \frac{(-1)^3}{2!} A_t^1 \cdots \frac{(-1)^{h+1}}{h!} A_t^{h-1} \right] \begin{bmatrix} x_{\tau k,1}^T \\ x_{\tau k,2}^T \\ \vdots \\ x_{\tau k,h}^T \end{bmatrix} B_t$$

$$\begin{bmatrix} x_{\tau k,1} \\ x_{\tau k,2} \\ \vdots \\ x_{\tau k,h} \end{bmatrix} = \begin{bmatrix} \overline{x}_{\tau k} & 0 & \cdots & 0 \\ \overline{x}_{\tau k} & \overline{x}_{\tau k}^2 & & \vdots \\ \vdots & & \ddots & 0 \\ \overline{x}_{\tau k} & \overline{x}_{\tau k}^2 & \cdots & \overline{x}_{\tau k}^h \end{bmatrix}$$

$$\overline{x}_{\tau k} = v T_s$$

wherein $\eta_{i,h}(k)$ is a time-varying coefficient of polyhedron vertices related to network time lag k, which satisfies a relationship as follows:

$$\sum_{n=0}^{h} \eta_{i,n}(k) = 1$$

$$i = \{1, 2 \cdots \gamma\}$$

all signals act in a sampling cycle; $v \in [0,1)$ represents a time length where predictive control should account for the effective control signal transmitted at time $(k-1) T_s$ with control quantity at time k;

34) establishing an adaptive model predictive control algorithm for an uncertain system:
establishing a trajectory tracking dynamic optimization index based on the dynamic model as follows:

$$J(\xi(k), U(k-1), \Delta u(k)) =$$

$$\sum_{i=1}^{N_p} \left\| \xi_{\tau_k}(k+i) - \xi_{\tau_k}(k+i) \right\|^2 Q + \sum_{i=1}^{N_c} \|\Delta u(k+i)\|^2 R + \rho \varepsilon^2$$

where $N_p$ is a prediction time domain, $N_c$ is a control time domain, Q and R are weight matrices, ρ is a relaxation factor weight coefficient, and ε is a relaxation factor; and establishing a dynamic optimization model of a driverless vehicle trajectory tracking controller with network time lag in each control cycle as follows:

$$\min[\Delta u(t)^T, \varepsilon]^T H_t [\Delta u(t)^T, \varepsilon] + G_t [\Delta u(t)^T, \varepsilon]$$

$$\text{s.t.} \begin{bmatrix} \Delta U_{min} \\ y_{hcmin} \\ y_{scmin} - \varepsilon \end{bmatrix} \le \begin{bmatrix} \Delta U \\ y_{hc} \\ y_{sc} \end{bmatrix} \le \begin{bmatrix} \Delta U_{max} \\ y_{hcmax} \\ +y_{hcmax} + \varepsilon \end{bmatrix}$$

$$H_t = \begin{bmatrix} \Theta^T Q \Theta + R & 0 \\ 0 & \rho \end{bmatrix}, G_t = [2e^T Q \Theta \quad 0]$$

wherein ΔU is a control incremental constraint, $y_{hc}$ is a hard constraint output, $y_{sc}$ is a soft constraint output, the range of the soft constraint can be adjusted by the relaxation factor ε, and e is a tracking error in the prediction time domain; and 35) determining a next sampling time:

if a next time still exists in an instruction generated by a counting module of the steering domain controller, returning to step 33), otherwise ending a whole solution process.

There exist many specific applications of this disclosure, and the above example is only a preferred implementation of the disclosure. It should be noted that, for those of ordinary skill in the art, without deviating from the principle of the disclosure, several improvements can be made, and these improvements should also be regarded as the protection scope of this disclosure.

What is claimed is:

1. An electric truck steer-by-wire system, composed of a master control electric power module, a slave control electric power module, a road sensing motor module, a steering wheel, an upper steering column, a lower steering column, a rack-pinion steering gear, wheels, a first steering angle sensor, a second steering angle sensor, a steering domain controller and a vehicle-mounted CAN network;

wherein the steering wheel is connected with a torque input end of the upper steering column by a spline, the first steering angle sensor is mounted between the steering wheel and the upper steering column, and the road sensing motor module is mounted at a lower end of the upper steering column; no mechanical connection exists between the upper steering column and the lower steering column, a gap exists between the upper steering column and the lower steering column in a vertical direction, the second steering angle sensor is mounted at an input end of the lower steering column, an output end of the lower steering column is connected with the rack-pinion steering gear, the master control electric power module and the slave control electric power module are mounted on a rack of the rack-pinion steering gear, and an end of the rack is connected with the wheels;

the road sensing motor module consists of a road sensing controller, a first motor and a first deceleration mechanism; an output of the first motor is connected with an input of the first deceleration mechanism, and a torque is transmitted to the upper steering column after deceleration and torque is increased by the first deceleration mechanism; the road sensing controller controls the rotating speed of the first motor; the road sensing controller simulates a pavement steering torque according to an objective steering torque signal from the steering domain controller; the first steering angle sensor transmits a driver steering angle demand to the steering domain controller by the vehicle-mounted CAN network; the steering domain controller converts the driver steering angle demand into the objective steering torque signal and transmits the objective steering torque signal to the master control electric power module by the vehicle-mounted CAN network;

the master control electric power module consists of a master controller, a second motor and a second deceleration mechanism; an output end of the second motor is connected with an input of the second deceleration mechanism, and a torque is transmitted to the rack-pinion steering gear after deceleration and torque is increased by the second deceleration mechanism; the master controller calculates an objective current according to a steering torque demand from the steering domain controller, then distributes the current, and further transmits the objective current to the slave control electric power module;

the slave control electric power module consists of a slave controller, a third motor and a third deceleration mechanism; an output of the third motor is connected with an input of the third deceleration mechanism, and a torque is transmitted to the rack-pinion steering gear after deceleration and torque is increased by the third deceleration mechanism; and the master controller dynamically compares the first steering angle sensor with the second steering angle sensor according to the steering domain controller and the vehicle-mounted CAN network, so as to realize the tracking of a driving intention.

2. The electric truck steer-by-wire system according to claim 1, wherein the first motor, the second motor and the third motor all are permanent magnet synchronous motors.

3. The electric truck steer-by-wire system according to claim 1, wherein the first deceleration mechanism, the second deceleration mechanism and the third deceleration mechanism all are worm-gear deceleration mechanisms.

4. The electric truck steer-by-wire system according to claim 1, wherein the slave controller consists of a current acquisition circuit, so as to realize the acquisition of a present current signal of the third motor.

5. A network uncertainty control method for an electric truck steer-by-wire system, wherein the method uses a processor coupled with stored instructions implementing the method, wherein the instructions, when executed by the processor carry out steps of the method, comprising the following steps:

step 1): establishing an electric truck trajectory tracking linear error dynamic model with random network time lag, wherein the electric truck steer-by-wire system comprises a first steering angle sensor, a second steering angle sensor, a steering domain controller and a vehicle-mounted CAN network; the first steering angle sensor transmits a driver steering angle demand to the steering domain controller by the vehicle-mounted CAN network;

step 2): establishing an evaluation system of the trajectory tracking performance and dynamic model stability with random network time lag, and constructing an adaptive prediction model; wherein the electric truck steer-bywire system further comprises a road sensing motor module, and a steering wheel;

the road sensing controller controls the rotating speed of a first motor; the road sensing controller simulates a pavement steering torque according to an objective steering torque signal from the steering domain controller; the first steering angle sensor transmits a driver steering angle demand to the steering domain controller by the vehicle-mounted CAN network;

and step 3): constructing a time-varying matrix polytope random network time lag uncertainty term representation method and proposing an adaptive model predictive control algorithm for a polytope time lag uncertain system, wherein the electric truck steer-by-wire system further comprises a master control electric power module, a slave control electric power module, the master control electric power module consists of a master controller, a second motor and a second deceleration mechanism; an output end of the second motor is connected with an input of the second deceleration mechanism, and a torque is transmitted to the rack-pinion steering gear after deceleration and torque is increased by the second deceleration mechanism; the master controller calculates an objective current according to a steering torque demand from the steering domain controller, then distributes the current, and further transmits the objective current to the slave control electric power module; a master controller dynamically compares the first steering angle sensor with the second steering angle sensor according to the steering domain controller and the vehicle-mounted CAN network, so as to realize the tracking of a driving intention;

the slave control electric power module consists of a slave controller, a third motor and a third deceleration mechanism; an output of the third motor is connected with an input of the third deceleration mechanism, and a torque is transmitted to the rack-pinion steering gear after deceleration and torque is increased by the third deceleration mechanism;

and the steering domain controller converts the driver steering angle demand into the objective steering torque signal and transmits the objective steering torque signal to the master control electric power module by the vehicle-mounted CAN network.

6. The network uncertainty control method for the electric truck steer-by-wire system according to claim 5, wherein step 1) specifically comprises:

11) establishing an electric truck trajectory tracking linear error dynamic model containing random network time lag, as follows:

$$\dot{\tilde{X}} = A_t \tilde{X} + B_t \tilde{u}$$

$$\tilde{X} = [\dot{y} - \dot{y}_r \quad \dot{x} - \dot{x}_r \quad \varphi - \varphi_r \quad \dot{\varphi} - \dot{\varphi}_r \quad y - y_r \quad x - x_r]^T$$

$$\tilde{u} = u_f - u_{fr}$$

wherein $u_f$ is a control quantity of a front wheel steering angle with random network time lag, x and y are respectively a longitudinal displacement and a transverse displacement of a vehicle, $\dot{x}$ and $\dot{y}$ are respectively a longitudinal speed and a transverse speed of the vehicle, $\varphi$ and $\dot{\varphi}$ are respectively a yaw angle and a yaw rate of the vehicle; $X_r = [\dot{y}_r \quad \dot{x}_r \quad \varphi_r \quad \dot{\varphi}_r \quad y_r \quad x_r]$ is a state quantity at a reference point, and $u_{fr}$ is a reference control quantity;

$$A_t = \begin{bmatrix} \frac{-2(C_{cf} + C_{cr})}{m\dot{x}} & \frac{\partial f_{\dot{y}}}{\partial \dot{x}} & 0 & -\dot{x} + \frac{2(l_r C_{cr} - l_f C_{cf})}{m\dot{x}} & 0 & 0 \\ \dot{\varphi} - \frac{2C_{cf}\delta_f}{m\dot{x}} & \frac{\partial f_{\dot{x}}}{\partial \dot{x}} & 0 & \dot{y} - \frac{2l_f C_{cf}\delta_f}{m\dot{x}} & 0 & 0 \\ 0 & 0 & 0 & 1 & 0 & 0 \\ \frac{2(l_r C_{cr} - l_f C_{cf})}{I_z \dot{x}} & \frac{\partial f_{\dot{\varphi}}}{\partial \dot{x}} & 0 & \frac{-2(l_f^2 C_{cf} + l_r^2 C_{cr})}{I_z \dot{x}} & 0 & 0 \\ \cos(\varphi) & \sin(\varphi) & \dot{x}\cos(\varphi) - \dot{y}\sin(\varphi) & 0 & 0 & 0 \\ -\sin(\varphi) & \cos(\varphi) & -\dot{y}\cos(\varphi) - \dot{x}\sin(\varphi) & 0 & 0 & 0 \end{bmatrix}$$

$$B_t = \begin{bmatrix} \frac{2C_{cf}}{m} & \frac{2C_{cf}\left(2\delta_f - \frac{\dot{y} + l_f \dot{\varphi}}{\dot{x}}\right)}{m} & 0 & \frac{2l_f C_{cf}}{I_z} & 0 & 0 \end{bmatrix}^T$$

wherein $$\frac{\partial f_{\dot{y}}}{\partial \dot{x}} = \frac{2C_{cf}(\dot{y}_r + l_f \dot{\varphi}_r) + 2C_{cr}(\dot{y} - l_r \dot{\varphi})}{m\dot{x}^2} - \dot{\varphi}$$

$$\frac{\partial f_{\dot{x}}}{\partial \dot{x}} = \frac{2C_{cf}\delta_f(\dot{y} + l_f \dot{\varphi})}{m\dot{x}^2}$$

$$\frac{\partial f_{\dot{\varphi}}}{\partial \dot{x}} = \frac{2l_f C_{cf}(\dot{y} + l_f \dot{\varphi}) - 2l_r C_{cr}(\dot{y} - l_r \dot{\varphi})}{I_z \dot{x}^2}$$

12) performing discretization of the continuous model:

performing discretization on the electric truck trajectory tracking linear error dynamic model with a ground fixed coordinate system OXY, as follows:

$$\tilde{X}(k+1) = A_d \tilde{X}(k) + B_d \tilde{u}(k)$$

-continued wherein $$\begin{cases} A_d = e^{A_t T_s} = L^{-1}[sI - A_t]^{-1} \\ B_d = \int_0^{T_s} e^{A_t(T_s-\theta)} B_t d\theta \end{cases}$$

where $T_s$ is a sampling time, $L^{-1}$ is inverse Laplace transform, and S is a Laplace operator; and 13) performing augmentation on a system model:
establishing a new state quantity based on the state quantity and the control quantity of the electric truck trajectory tracking linear error dynamic model with random network time lag established in step 11), as follows:

$$\xi(k) = \begin{bmatrix} \tilde{X}(k) \\ \tilde{u}(k-1) \end{bmatrix}$$

to obtain a state space expression of a discrete ideal trajectory tracking system, as follows:

$$\xi(k+1) = \overline{A}_d \xi(k) + \overline{B}_d \Delta u(k)$$

wherein $$\overline{A}_d = \begin{bmatrix} A_d & B_d \\ 0 & I \end{bmatrix}, \overline{B}_d = \begin{bmatrix} B_d \\ I \end{bmatrix}.$$

7. The network uncertainty control method for the electric truck steer-by-wire system according to claim 5, wherein step 2) specifically consists of:

21) establishing a relationship between a prediction time domain and a control time domain, wherein
the relationship between the control time domain and the prediction time domain is as follows:

$$N_c = \text{round}\left(\frac{N_p}{n}\right)$$

where $N_p$ is a prediction time domain, $N_c$ is a control time domain, round (.) is a rounding function, n is an undetermined coefficient, and n={1, 2 ... $N_p$};

22) establishing an adaptive prediction time domain function:
proposing an adaptive prediction time domain function, as follows:

$$N_p = f_{N_p}(V_{xk}, C_k, \tau_k) = K_1 V_{xk} + b_1 + k_2 C_k + b_2 + k_3 \tau_k + b_3$$

where $V_{xk}$, $C_k$ and $\tau_k$ are respectively a longitudinal speed of the vehicle, a trajectory curvature and a network delay obtained by a time stamp at time k, $k_i$ and $b_i$ are undetermined coefficients, and i=1, 2, 3, obtained by offline optimization;

23) establishing a parameter offline optimization model, wherein
the parameter offline optimization model is as follows:

$$\begin{cases} \min \ f_{fitness} = \frac{k_1}{s_1} f_{Time}(N_P, N_c) + \frac{k_2}{s_2} f_{Error}(N_P, N_c) \\ \text{s.t.} \quad \max\{f_{Time}(N_P, N_c)\} \le T_s \end{cases}$$

where $k_1$ and $k_2$ are weight factors, and $s_1$ and $s_2$ are scale factors used to convert two objectives into the same order of magnitude; an objective function $f_{Time}(.)$ is a CPU calculation time required for a rolling optimization process, and an objective function $f_{Error}(.)$ is an average trajectory tracking error in a whole process;

24) updating the prediction model, wherein
after an undermined parameter is obtained by solving offline optimization, a system prediction equation expression is obtained as follows:

$$Y(k) = \psi \xi(k) + \Theta \Delta u(k)$$

when the prediction time domain $N_p$ and the control time domain $N_c$ change adaptively according to working conditions, coefficient matrices of the state quantity and the control quantity in the prediction model also change accordingly, where Y(k) is a prediction output at time k, $\xi(k)$ is a state vector at time k, $\Delta u(k)$ is a control increment vector at time k, $\psi$ and $\Theta$ are respectively coefficient matrices of the state quantity and the control quantity, and the expressions are as follows:

$$\psi = \begin{bmatrix} \overline{C}_d \overline{A}_d \\ \overline{C}_d \overline{A}_d^2 \\ \vdots \\ \overline{C}_d \overline{A}_d^{N_p} \end{bmatrix}, \Theta = \begin{bmatrix} \overline{C}_d \overline{B}_d & 0 & \cdots & 0 \\ \overline{C}_d \overline{A}_d \overline{B}_d & \overline{C}_d \overline{B}_d & & \vdots \\ & & \ddots & 0 \\ & & & \overline{C}_d \overline{B}_d \\ \vdots & \vdots & & \vdots \\ \overline{C}_d \overline{A}_d^{N_p-1} \overline{B}_d & \overline{C}_d \overline{A}_d^{N_p-2} \overline{B}_d & \cdots & \overline{C}_d \overline{A}_d^{N_p-N_c-1} \overline{B}_d \end{bmatrix};$$

25) determining a next sampling time:
if the next time still exists in an instruction generated by a counting module of a steering domain controller, returning to step 23), otherwise ending the whole solution process.

8. The network uncertainty control method for the electric truck steer-by-wire system according to claim 5, wherein step 3) specifically comprises:

31) receiving an upper layer trajectory signal input and setting a corresponding filter of a steering domain controller to a high level;

32) establishing a time lag augmented system model:
establishing a generalized state vector of the system with random network time lag as follows:

$$\xi_{\tau_k}(k) = [\tilde{X}(k) u(k-1) \ldots u(k-\gamma-1)]^T$$

establishing a discrete system state equation considering random network time lag as follows:

$$\xi_{\tau_k}(k+1) = \overline{A}_{d\tau_k} \xi_{\tau_k}(k) + \overline{B}_{d\tau_k} \Delta u(k) + \Delta_k \Delta U(k)$$

wherein $$\overline{A}_{d\tau_k} = \begin{bmatrix} A_d & \Delta_{1,k} & \cdots & \Delta_{\gamma-1,k} & \Delta_{\gamma,k} \\ 0 & I & \cdots & 0 & 0 \\ 0 & 0 & I & & 0 \\ \vdots & \vdots & & \ddots & \vdots \\ 0 & 0 & \cdots & 0 & I \end{bmatrix}, \overline{B}_{d\tau_k} = \begin{bmatrix} B_{d\tau_k} \\ I \\ 0 \\ \vdots \\ 0 \end{bmatrix}, \overline{B}_{d\tau_k} = \begin{bmatrix} B_{d\tau_k} \\ I \\ 0 \\ \vdots \\ 0 \end{bmatrix}$$

-continued $$\Delta_k = \begin{bmatrix} \Delta_{1,k} & \Delta_{2,k} & \cdots & \Delta_{\gamma,k} \\ I & & & \\ & I & & \\ & & \ddots & \\ & & & I \end{bmatrix}, \Delta U(k) = \begin{bmatrix} \Delta u(k-1) \\ \Delta u(k-2) \\ \vdots \\ \Delta u(k-\gamma) \end{bmatrix}$$

33) establishing a time lag uncertainty coefficient linear representation method and a random network time lag polytope model, wherein
$\Delta_{i,k}$ is an uncertainty coefficient caused by random network delay as follows:

$$\Delta_{i,k} = \int_0^{\Delta \Gamma_{k-i}} e^{A_t(T_s-\theta)} B_t d\theta$$

$i = \{1, 2 \ldots \gamma\}$ $$\begin{cases} \Delta \Gamma_{k-i} = \Gamma_{k-i} - \Gamma_{k-i-1} \\ \Gamma_{k-i} = \min\{\max\{0, \tau_{k-i} - iT_s\}, T_s\} \end{cases}$$

where $\Delta \Gamma_i$ is an integral upper limit which is an actual action time length of a control signal $\Delta u(k-i)$ in a corresponding interval, and $\tau_{k-i}$ is a total delay length of signals transmitted at time $(k-i)T_s$; and
establishing a random network time lag uncertainty coefficient matrix, which can be expressed by a polytope model as follows:

$$\begin{bmatrix} \Delta_{0,k} \\ \Delta_{1,k} \\ \vdots \\ \Delta_{\gamma,k} \end{bmatrix} = \begin{bmatrix} \eta_{0,0}(k) \\ \eta_{1,0}(k) \\ \vdots \\ \eta_{\gamma,0}(k) \end{bmatrix} \hat{\Delta}_0 + \begin{bmatrix} \eta_{0,1}(k) \\ \eta_{1,1}(k) \\ \vdots \\ \eta_{\gamma,2}(k) \end{bmatrix} \hat{\Delta}_1 + \ldots + \begin{bmatrix} \eta_{0,h}(k) \\ \eta_{1,h}(k) \\ \vdots \\ \eta_{\gamma,h}(k) \end{bmatrix} \hat{\Delta}_h$$

$$\begin{bmatrix} \hat{\Delta}_1 \\ \hat{\Delta}_2 \\ \vdots \\ \hat{\Delta}_h \end{bmatrix} = e^{A_t T_s} \begin{bmatrix} \frac{(-1)^2}{1!} A_t^0 & \frac{(-1)^3}{2!} A_t^1 & \cdots & \frac{(-1)^{h+1}}{h!} A_t^{h-1} \end{bmatrix} \begin{bmatrix} x_{\tau k,1}^T \\ x_{\tau k,2}^T \\ \vdots \\ X_{\tau k,h}^T \end{bmatrix} B_t$$

$$\begin{bmatrix} x_{\tau k,1} \\ x_{\tau k,2} \\ \vdots \\ x_{\tau k,h} \end{bmatrix} = \begin{bmatrix} \bar{x}_{\tau k} & 0 & \cdots & 0 \\ \bar{x}_{\tau k} & \bar{x}_{\tau k}^2 & & \vdots \\ \vdots & & \ddots & 0 \\ \bar{x}_{\tau k} & \bar{x}_{\tau k}^2 & \cdots & \bar{x}_{\tau k}^h \end{bmatrix}$$

$\bar{x}_{\tau k} = v T_s$ where $\eta_{i,h}(k)$ is a time-varying coefficient of polyhedron vertices related to network time lag k, which satisfies a relationship as follows:

$$\sum_{n=0}^{h} \eta_{i,n}(k) = 1$$

$i = \{1, 2 \ldots \gamma\}$ $v=[0,1)$ represents a time length where predictive control should account for the effective control signal transmitted at time $(k-i)T_s$ with the control quantity at time k;

34) establishing an adaptive model predictive control algorithm for an uncertainty system:
establishing a trajectory tracking dynamic optimization index based on the dynamic model as follows:

$$J(\xi(k), U(k-1), \Delta u(k)) = \sum_{i=1}^{N_p} \|\xi_{\tau_k}(k+i) - \xi_{\tau_k}(k+i)\|^2 Q + \sum_{i=1}^{N_c} \|\Delta u(k+i)\|^2 R + \rho \varepsilon^2$$

where $N_p$ is a prediction time domain, $N_c$ is a control time domain, Q and R are weight matrices, $\rho$ is a relaxation factor weight coefficient, and $\varepsilon$ is a relaxation factor; and
establishing a dynamic optimization model of a driverless vehicle trajectory tracking controller with network time lag in each control cycle as follows:

$$\min[\Delta u(t)^T, \varepsilon]^T H_t [\Delta u(t)^T, \varepsilon] + G_t [\Delta u(t)^T, \varepsilon]$$

$$\text{s.t.} \begin{bmatrix} \Delta U_{min} \\ y_{hcmin} \\ y_{scmin} - \varepsilon \end{bmatrix} \le \begin{bmatrix} \Delta U \\ y_{hc} \\ y_{sc} \end{bmatrix} \le \begin{bmatrix} \Delta U_{max} \\ y_{hcmax} \\ +y_{hcmax} + \varepsilon \end{bmatrix}$$

$$H_t = \begin{bmatrix} \Theta^T Q \Theta + R & 0 \\ 0 & \rho \end{bmatrix}, G_t = [2e^T Q \Theta \quad 0]$$

where $\Delta U$ is a control incremental constraint, $y_{hc}$ is a hard constraint output, $y_{sc}$ is a soft constraint output, the range of the soft constraint output can be adjusted by the relaxation factor $\varepsilon$, and e is a tracking error in the prediction time domain; and 35) determining a next sampling time:
if a next time still exists in an instruction generated by a counting module of the steering domain controller, returning to step 33), otherwise ending a whole solution process.

* * * * *